(12) United States Patent
Vatsky (10) Patent No.: US 7,341,007 B2
(45) Date of Patent: Mar. 11, 2008

(54) BALANCING DAMPER (76) Inventor: Joel Vatsky, 501 Lindabury La., Pottersville, NJ (US) 07979

( * ) Notice: Subject to any disclaimer, the term of this patent is extended or adjusted under 35 U.S.C. 154(b) by 0 days.

(21) Appl. No.: 10/379,621

(22) Filed: Mar. 5, 2003

(65) Prior Publication Data
US 2004/0173128 A1 Sep. 9, 2004

(51) Int. Cl.
F23K 3/02 (2006.01)

(52) U.S. Cl. .............. 110/104 B; 110/232; 110/104 R; 110/263

(58) Field of Classification Search ............. 110/185, 110/261, 263, 264, 347, 265, 104 B, 297, 110/104 R, 232; 406/181, 182, 183, 100
See application file for complete search history.

(56) References Cited

U.S. PATENT DOCUMENTS

| | | | |
|---|---|---|---|
| 993,381 A | 5/1911 | Kennedy | |
| 1,100,634 A | 6/1914 | Turner | |
| 1,316,439 A | 9/1919 | Gillson | |
| 1,477,824 A | 12/1923 | Grindle | |
| 1,708,496 A | 4/1929 | Clendon | |
| 1,747,522 A * | 2/1930 | Marchand | 110/104 R |
| 2,079,420 A | 5/1937 | Nielsen | |
| 3,002,472 A | 10/1961 | Miller | |
| 3,267,891 A | 8/1966 | Hemker | |
| 3,524,418 A | 8/1970 | Cowan | |
| 4,459,922 A | 7/1984 | Chadshay | |
| 4,477,248 A * | 10/1984 | Dulac | 431/153 |
| 4,602,571 A * | 7/1986 | Chadshay | 110/264 |
| 4,806,056 A * | 2/1989 | Rouse et al. | 414/160 |
| 4,885,999 A * | 12/1989 | Baba et al. | 110/186 |
| 5,010,827 A * | 4/1991 | Kychakoff et al. | 110/185 |
| 5,090,339 A * | 2/1992 | Okiura et al. | 110/263 |
| 5,593,131 A | 1/1997 | Briggs, Jr. et al. | |
| 5,685,240 A | 11/1997 | Briggs, Jr. et al. | |
| 6,155,183 A * | 12/2000 | Vierstra et al. | 110/345 |
| 6,799,525 B2 * | 10/2004 | Manos et al. | 110/106 |

* cited by examiner

Primary Examiner—Kenneth Rinehart
(74) Attorney, Agent, or Firm—Lerner, David, Littenberg, Krumholz & Mentlik, LLP (57) ABSTRACT An apparatus for use in a furnace system to facilitate efficient and complete combustion of coal streams in a carrier gas. The apparatus, capable of being positioned horizontally or vertically in the coal pipes between the grinding mills and the furnace burner, contains a plurality of adjustable blades that are movable between an open and closed position. The position of the adjustable blades and the differing geometric shapes of the apparatus housing manipulate the amount and direction of coal streams in a carrier gas. This design reduces the amount of turbulent eddies in the pipe system, which helps to achieve a more homogenous flow of coal in a carrier gas and the efficient and complete combustion of coal in a carrier gas within the furnace burner.

9 Claims, 10 Drawing Sheets

BALANCING DAMPER

CROSS-REFERENCE TO RELATED APPLICATIONS

This application is related to the copending U.S. patent application entitled "Tower Distributor," filed on Feb. 7, 2003 to Joel Vatsky.

BACKGROUND OF THE INVENTION

Many industrial processes require the equal distribution of heterogeneous flows to multiple receptors. For example in the electric utility industry, pulverized coal ("PC") is transported through a pipe (duct) system that connects a grinding mill to one, or more, burners of a furnace. The PC is transported within the pipe system by a carrier gas, e.g., air. Thus, the heterogeneous flow, or stream, is made up of the PC and air (i.e., a two-phase flow or multi-phase flow). Ideally, one grinding mill is capable of supplying one or more such streams to multiple burners (receptors) of the furnace.

Unfortunately, as a stream moves through a long length of pipe, the solid particles in the stream tend to concentrate together in a pattern generally characterized as being in the shape of a rope strand. This phenomenon is commonly referred to as roping, or laning. As such, any attempt to further distribute, or split, a stream into multiple streams for transport to respective receptors seldom, if ever, yields equal amounts of PC going to each of the receptors. In other words, when roping occurs in a stream, splitting that stream into multiple streams results in a flow imbalance between the multiple streams. This flow imbalance is also compounded by unequal pressure drops across the coal pipes caused by non-identified pipe length and configurations. Resulting flow imbalances could be on the order of ±30% between the multiple streams.

Likewise, with respect to receptors fed by multiple sources, roping makes it difficult to combine the flows from these multiple sources such that each of the receptors are supplied with equal flows.

Figure 1:
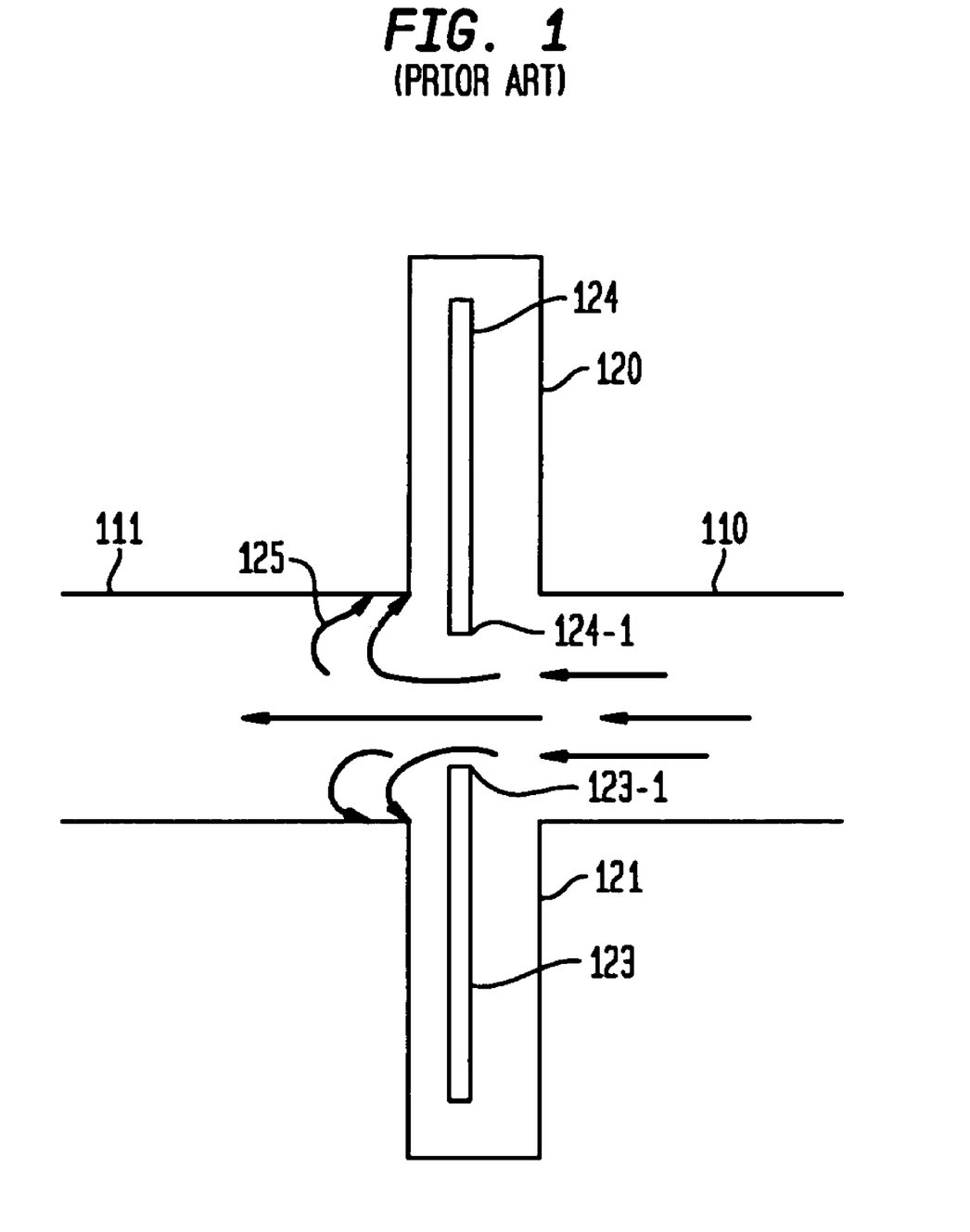
FIG. 1 shows a prior art adjustable orifice.

Various methods and devices have been utilized to obtain more uniform and homogenous two-phase flow through a fuel pipe system, as the flow travels from the coal mill to the furnace. Such methods and devices are implemented at different points downstream of the coal mill. One such method and device is a conventional adjustable orifice, as illustrated in FIG. 1. The conventional adjustable orifice can be implemented at any point along the furnace pipe system. Such an adjustable orifice comprises opposed gate boxes 120 and 121 located along a pipe or between pipes. The gate boxes include slidable gates 123 and 124, which can be adjusted to regulate the resistance to the flow of coal and a carrier gas flowing into the pipe 111 from pipe 110 by altering the opening between gates 123 and 124.

To increase the amount of coal and a carrier gas into the pipe 111, the gates can be retracted into the gate boxes 120 and 121. Conversely, to reduce the amount of flow through the pipe 111, the gates 123 and 124 can be positioned closer together.

The use of such an adjustable orifice has disadvantages. The adjustable orifice was initially designed for use in a single-phase flow. As shown in FIG. 1, if used in a two-phase system, once the flow passes through the gateway opening, coal eddies 125 are created from streams of coal, which are interrupted as they travel over the top edges 123-1 and 124-1 of the gates 123 and 124. Such eddies not only wear down the interior walls of the pipe, but leave piles of coal immediately outside the gates 123 and 124. Additionally, coal piles up within the gate boxes 120 and 121, unless a complicated sealing system is used, eventually making it difficult to retract the gates into the gate boxes. As a result such orifices are most effective when used in a vertical direction, in order to minimize coal pile-up downstream of the gates.

SUMMARY OF THE INVENTION

The present invention relates to an improved furnace system that supplies a uniform flow of fuel and a carrier gas such as through a pipe system to a furnace. Specifically, the present invention is directed to a furnace system having a balancing damper assembly that contains a plurality of adjustable blades. The adjustable blades are constructed and arranged so as to facilitate an efficient and uniform flow of fuel and a carrier gas in a burner assembly.

In one embodiment of the invention, a balancing damper comprises a housing, with an inlet end and an outlet end, that contains a plurality of blades disposed within the center of the housing. Furthermore, there are at least two blades that are capable of being moved between an open and closed position. This particular arrangement and construction of the blades allows streams of pulverized coal and a carrier gas that enter the balancing damper housing, to travel between the two blades, as well as between the outer edges of the blades and the inner edges of the housing walls.

In another embodiment, the balancing damper further comprises at least one blade that has at least one turning baffle.

In accordance with another aspect of this invention, an assembly for use in a furnace system comprises three sections: a burner assembly, a pipe arranged upstream of the burner assembly, and a balancing damper located within the pipe. The balancing damper comprises a housing having an inner and outer wall, at least two blades located within the housing that are capable of being moved between an open and closed position.

In another embodiment, the assembly for use in a furnace system further comprises a tower distributor. In yet another embodiment, the assembly comprises a fuel injector. In another embodiment, the assembly comprises an air register assembly.

In accordance with another aspect of this invention, a furnace system is comprised of four components: a furnace, a burner assembly, which delivers pulverized fuel in a carrier gas, a pipe that is arranged upstream of the burner assembly, and a balancing damper located downstream of a fuel source.

A balancing damper according to the present invention will overcome the shortcomings in the prior art. A balancing damper according to the present invention will allow optimum flow of coal and a carrier gas, while prolonging the life of the pipe system. The design of the present invention reduces the amount of turbulent eddies present in a pipe system by directing any turbulent eddies towards the center of the pipe. This reduces the amount of wear and tear on the interior walls of the pipe. The present design is also advantageous because unlike prior art orifices, it may be positioned in the horizontal or vertical direction without coal piling up downstream of the balancing damper.

It is therefore, an object of the present invention to provide an assembly for use in a furnace system that will produce a more homogeneous flow of coal in a carrier gas and the efficient and complete combustion of coal in a carrier gas within the furnace burner.

It is also an object of the present invention to provide a balancing damper for use in a furnace system that will produce a single, laminar, and homogeneous stream.

It is also an object of the present invention to provide a balancing damper for use in a furnace system that will prolong the life of the pipes carrying a two-phase flow of pulverized coal and a carrier gas.

Another object of this invention is to provide a balancing damper for use in a furnace system that is capable of being oriented in either the vertical or horizontal position along a furnace pipe assembly.

Another object of this invention is to provide a balancing damper for use in a furnace assembly that will eliminate the buildup of coal that collects along the pipe.

DETAILED DESCRIPTION

Figure 2:
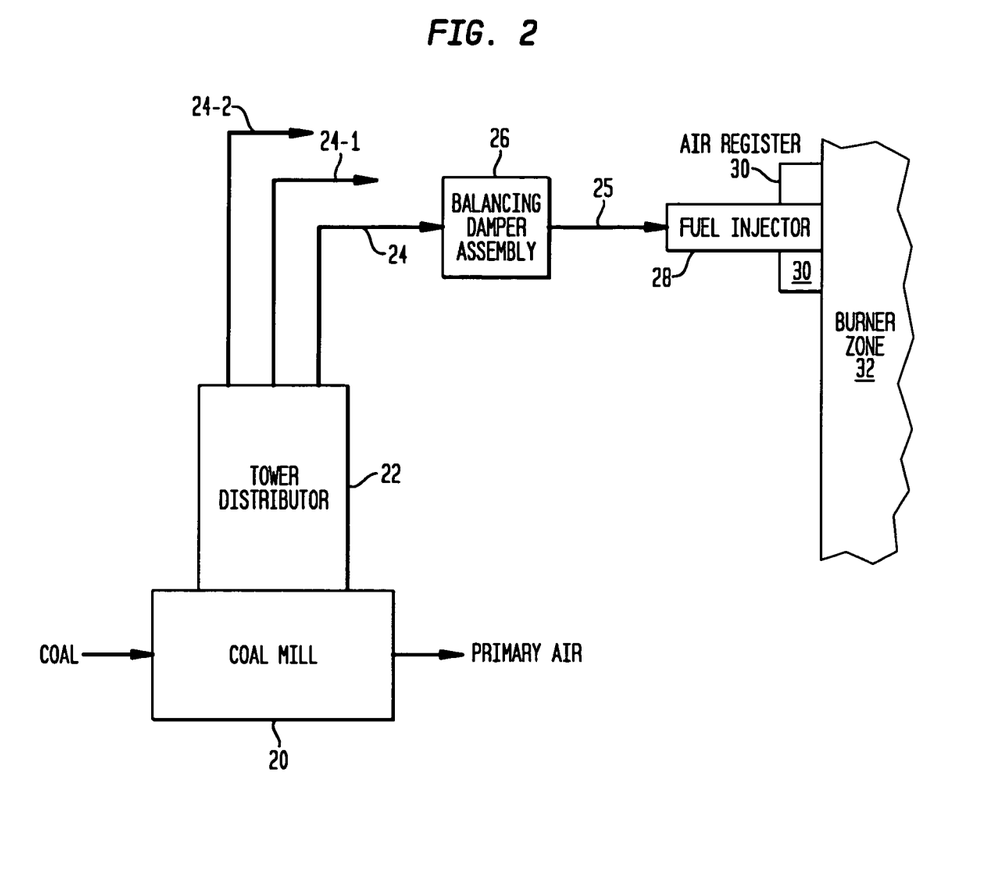
FIG. 2 is an illustrative block diagram of a furnace system's fuel and primary air circuit according to the present invention.

A preferred furnace assembly according to the present invention is illustrated in FIG. 2. The furnace assembly comprises a coal mill 20, coal pipes 24, 24-1, 24-2 and 25, a balancing damper assembly 26, a tower distributor 22, a fuel injector 28, an air register assembly 30, and a burner zone 32. Streams of fuel, such as pulverized coal, and a carrier gas (e.g., air) originate at the coal mill 20. The flow passes through a tower distributor 22 that helps to provide a balanced two-phase flow of fuel and a carrier gas prior to their entry into a coal pipe 24. Tower distributor 22, such as that disclosed in a related U.S. application entitled "Tower Distributor" to Vatksy, which is incorporated by reference herein, has an elongated passageway to provide an area for turbulent eddies to settle down and form a more laminar and homogenous flow of fuel and air. Once the flow of pulverized coal and primary air travel through the tower distributor 22, it is distributed among one or more coal pipes, such as represented by pipes 24, 24-1, 24-2 and 25. The coal pipes eventually lead the flow of coal and carrier air into a burner zone 32, where the fuel stream is consumed. For simplicity, the second stream with respect to coal pipe 24 is only described herein.

During its travel through coal pipes 24 and 25, the fuel flow is typically exposed to turbulence. To reduce the amount of turbulence created downstream of the coal mill or tower distributor, the fuel flow is further directed in accordance with the principal of the invention through a balancing damper assembly 26, which can be located a predetermined distance downstream from the coal mill 20. The balancing damper assembly 26 permits on-line adjustment of resistance in the pipe circuits to optimize pipe-to-pipe coal balance. In doing so, it prolongs the life of the pipes 24 and 25 by reducing the occurrences of turbulent streams of pulverized coal and air that impinge upon the coal pipes and directing turbulent streams towards the center of the pipe. The balancing damper assembly 26 is described in greater detail below.

Once the flow of fuel and air passes through the balancing damper assembly 26, the flow will pass through coal pipe 25 that feeds directly into fuel injector 28. Air register assemblies 30 provide a swirl of air that surrounds the fuel injector. This permits adjustment of the flame that results when the fuel and carrier air are injected into the burner zone 32.

The overall effect of the furnace assembly of the present invention is to achieve improved balance of coal and carrier air between coal pipes leaving a mill, while prolonging the life of the furnace assembly components. This ultimately allows a greater percentage of fuel to be burned in the burner zone, thereby reducing the amount of harmful pollutants emitted into the atmosphere and increasing the efficiency of the furnace system.

It should be noted that in alternative embodiments, the furnace assembly may comprise different variations of the aforementioned system. Certain components of the assembly, such as the tower distributor and air register assembly need not be present for the furnace assembly to function properly. Thus, an alternative furnace assembly may consist of a coal mill, a balancing damper assembly (i.e., an adjustable damper assembly) and fuel injector. Similarly, another furnace assembly may consist of a coal mill, a balancing damper assembly, a fuel injector and an air register assembly.

Figure 3:
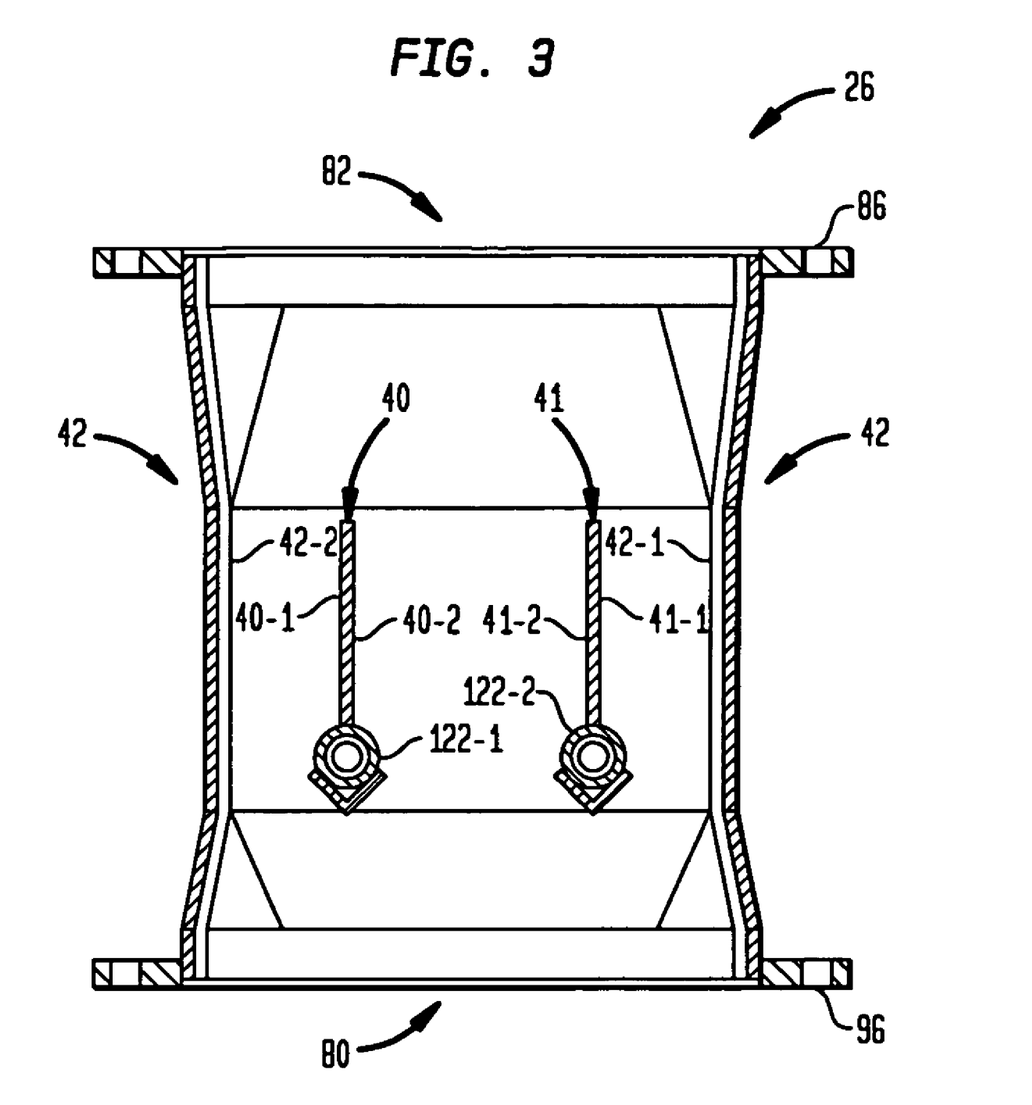
FIG. 3 is a cross-sectional view of a balancing damper assembly in accordance with one principal of the invention.

In the description that follows, references will be made to FIGS. 3-11, all of which illustrate various aspects of the invention. A balancing damper assembly 26 according to the present invention is illustrated in FIG. 3. The balancing damper assembly 26 preferably has a housing 42 and two blades 40 and 41 disposed within the center of the housing 42. The blades respectively have outer edges 40-1 and 41-1 and interior edges 40-2 and 41-2. The balancing damper assembly 26 may be constructed using steel with various wear-resistant materials, such as metals, certain polymers, ceramic, etc.

Figure 4:
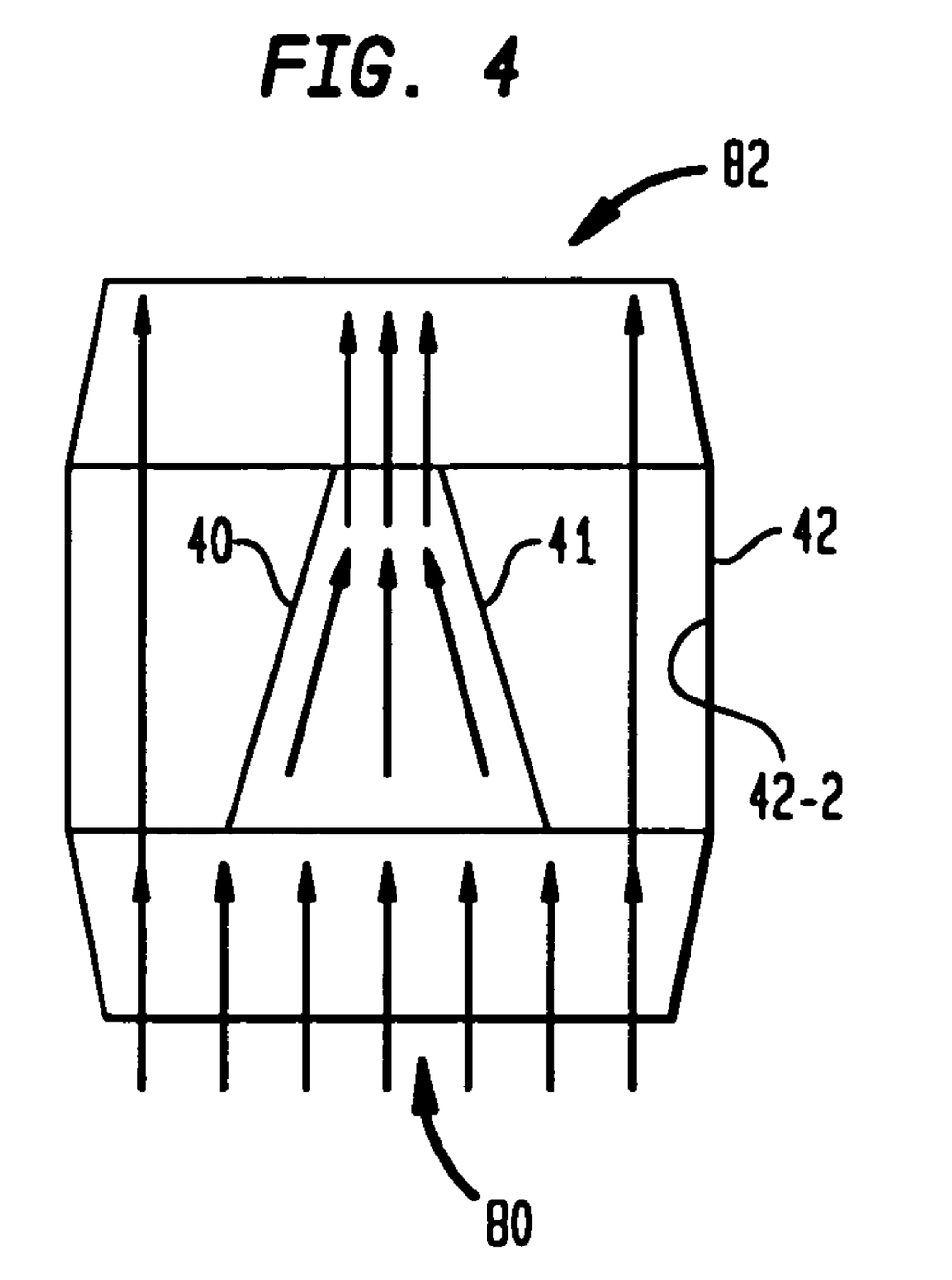
FIG. 4 is a second cross sectional view of a two-phase flow traveling through the balancing damper assembly.
Figure 6:
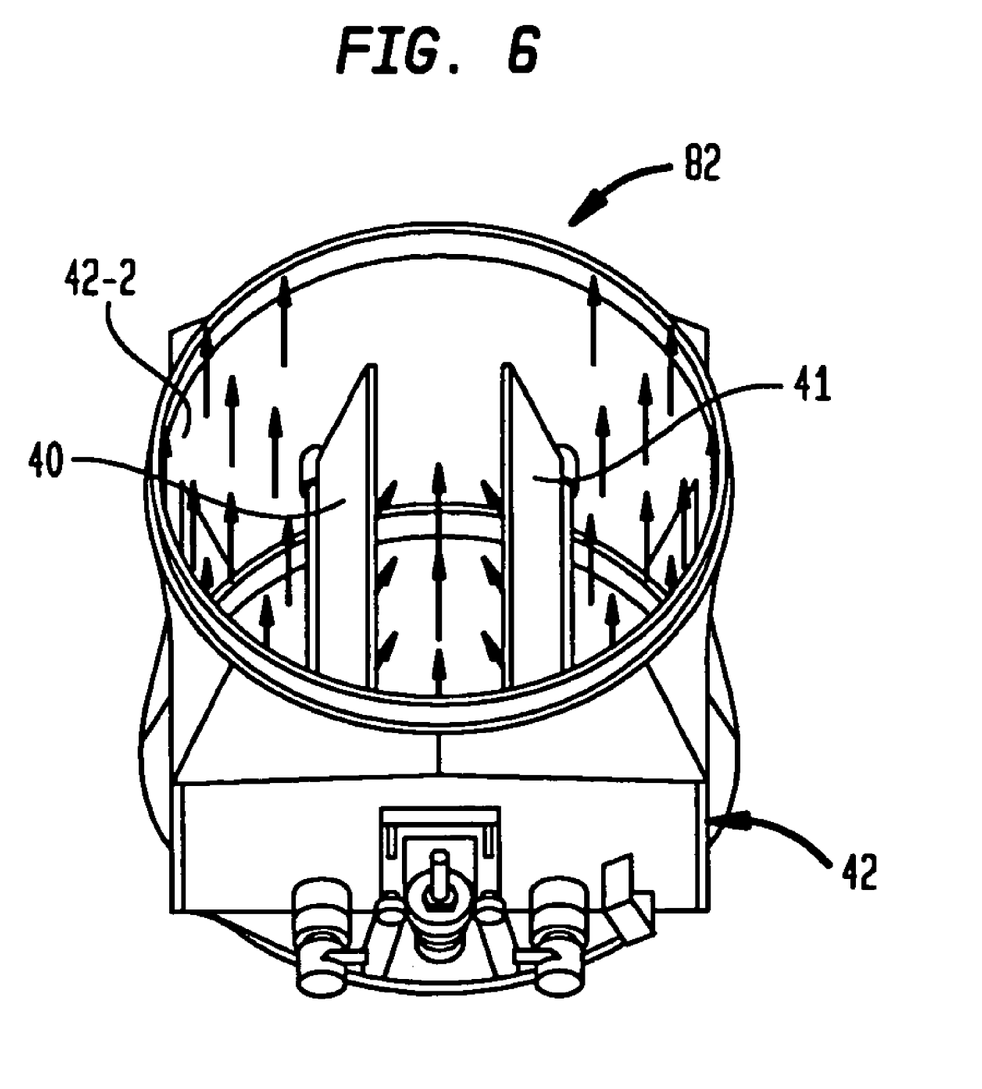
FIG. 6 is a perspective top view of the balancing damper assembly of FIG. 3.

The two-phase flow of fuel and air enters the balancing damper assembly 26 at its inlet end 80. The fuel flow travels between the inner edges 40-2 and 41-2, as well as between the inner walls 42-2 of the housing 42 and the outer edges 40-1 and 41-1 of the blades 40 and 41. Once the flow has passed around the blades 40 and 41, the flow continues through the outlet end 82 into coal pipe 25 (FIG. 2). The illustration of the directions and flow of air are also shown in FIGS. 4 and 6.

Figure 7:
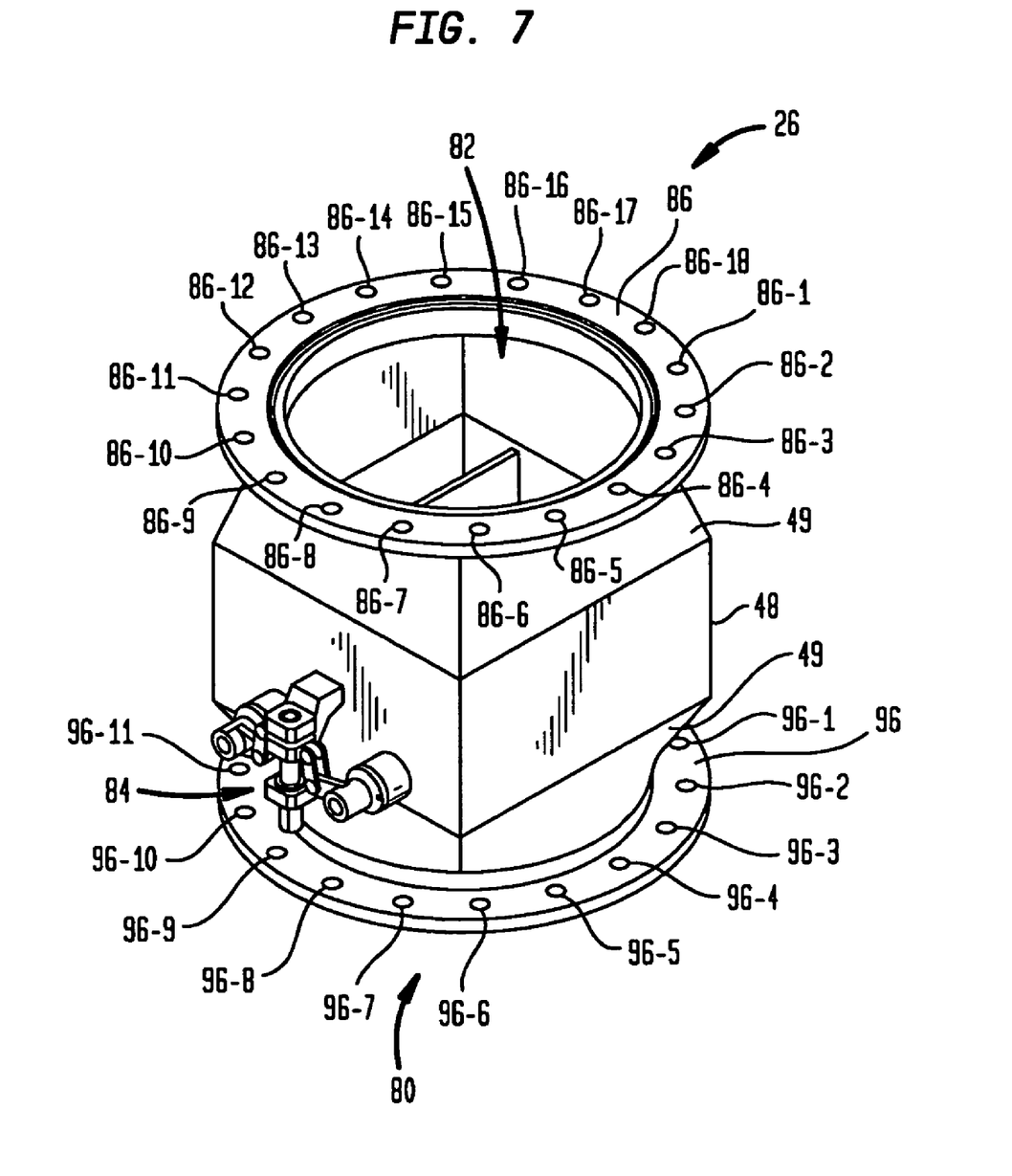
FIG. 7 is another perspective top view of the balancing damper assembly according to the present invention.

In order to regulate or alter the flow of air and fuel passing through the balancing damper assembly 26, the blades 40 and 41 can be adjusted. This is accomplished through use of an adjustment means 84, as illustrated in FIGS. 7, 8 and 9 and described further below.

A preferred adjustment means comprises a system wherein the blades 40 and 41 are simultaneously adjustable.

Figure 5:
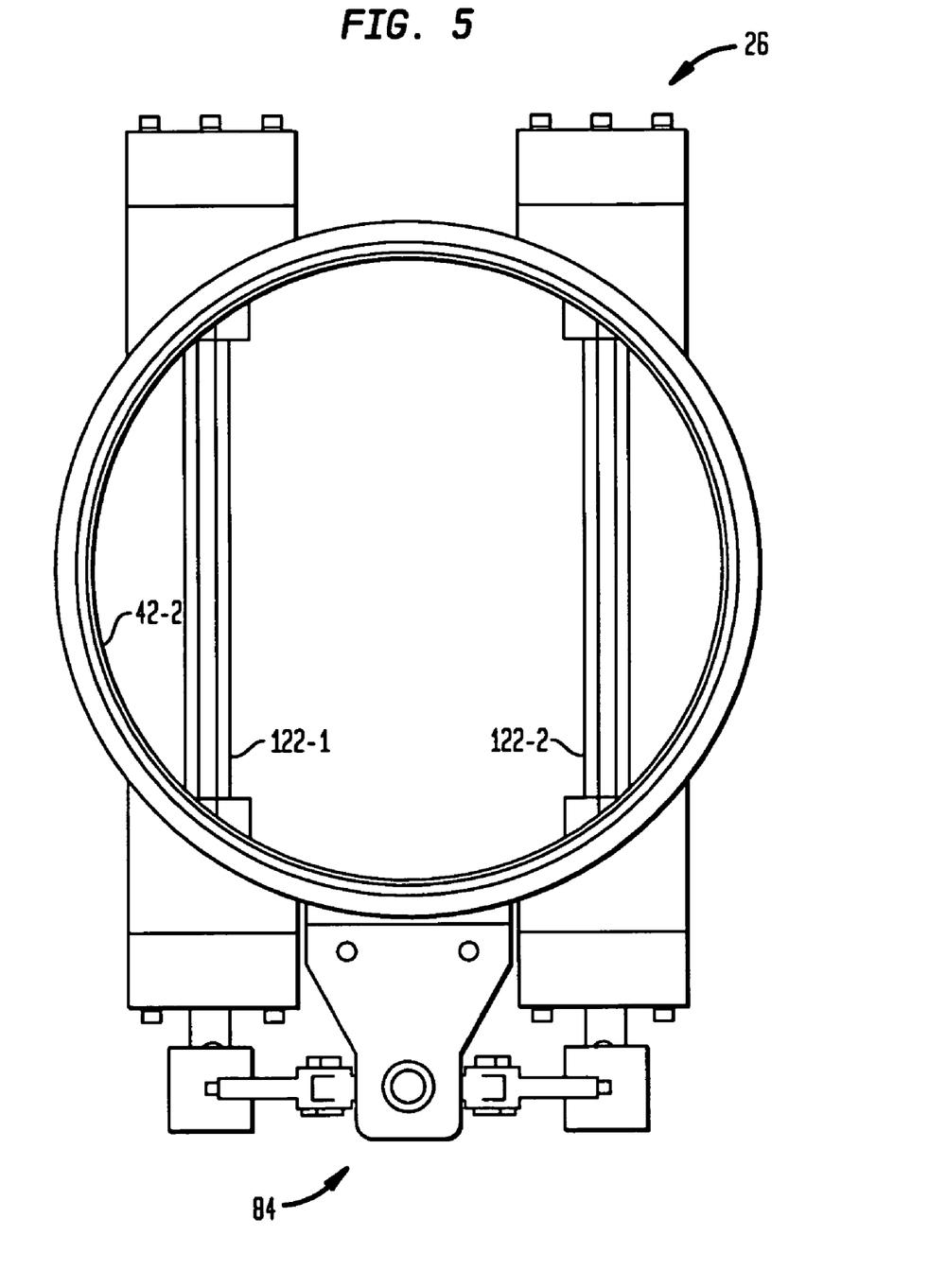
FIG. 5 is a top view of the balancing damper assembly of FIG. 3.

In the present invention, the blades 40 and 41 are connected to rotatable shafts 122-1 and 122-2, as illustrated in FIGS. 3 and 5. The rotatable shafts 122-1 and 122-2 extend through the housing 42 of the balancing damper assembly 26.

Figure 8:
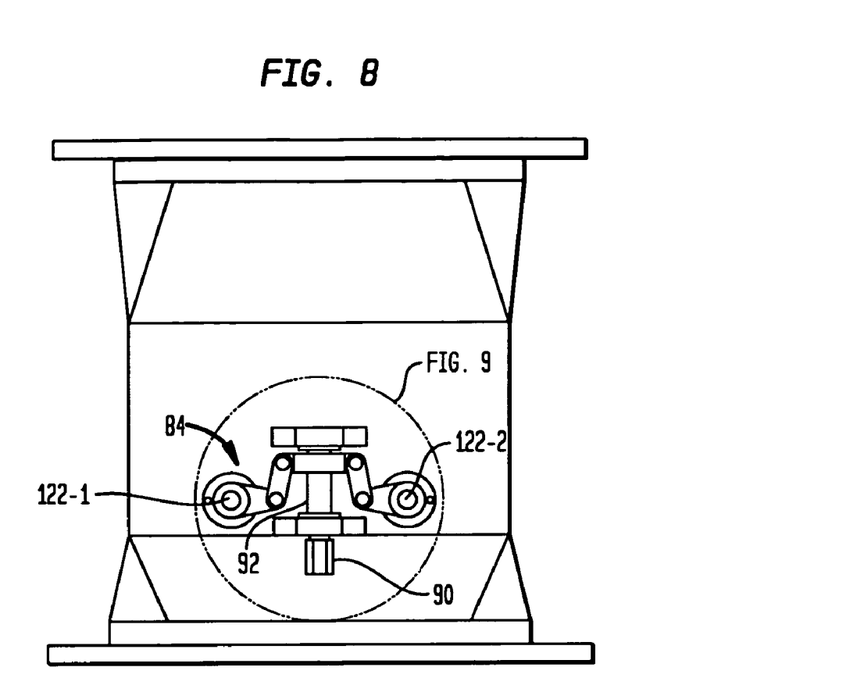
FIG. 8 is a side view of an adjustment means for the balancing damper assembly of FIG. 3.
Figure 9:
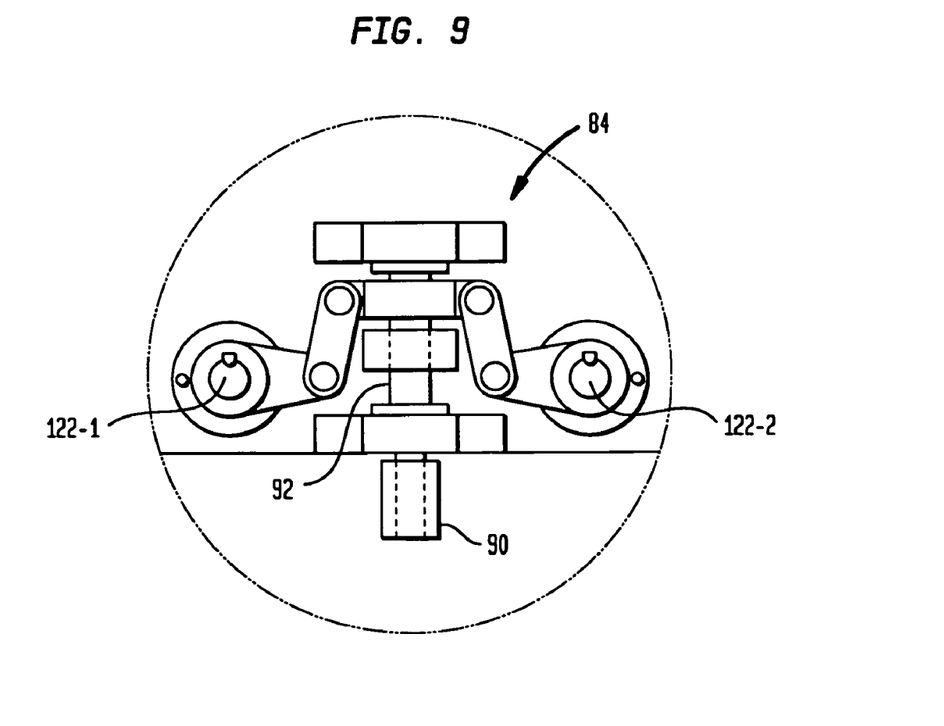
FIG. 9 is a second, enlarged, side view of an adjustment means for the balancing damper assembly.

As shown in FIGS. 8 and 9, a control knob 90 is provided to adjust rotatable shafts 122-1 and 122-2, such that the blades 40 and 41 can be placed in an open or closed position. Control knob 90 turns control stem 92, which is in turn connected to rotatable shafts 122-1 and 122-2. Control knob 90 can be rotated in either a clockwise or counter-clockwise direction. This manipulation forces movement of the control stem 92 to shift upwards or downwards (depending on the direction the control knob is turned), thereby causing movement of the rotatable shafts 122-1 and 122-2. In a preferred embodiment, clockwise rotation of control knob 90 will cause movement of the rotatable shafts 122-1 and 122-2, such that blades 40 and 41 move towards each other into a closed position. Similarly, rotation of the control knob 90 in a counter-clockwise direction will cause movement of the rotatable shafts 122-1 and 122-2, such that blades 40 and 41 move apart from each other into an open position. In a preferred embodiment, control knob 90 is capable of adjusting both blades 40 and 41 at the same time.

In an alternative embodiment, the adjustment means may be electronically controlled, either by remote control, a control panel implemented on the balancing damper itself or another part of the furnace assembly. Additionally, the adjustment means may be constructed and arranged so that the blades are individually controlled. In such an embodiment, separate controls may be implemented to independently adjust each blade. Further, the counter-clockwise movement of the control knob 90 may move the blades into a closed position and a clockwise movement of the control knob 90 will move the blades into an open position.

The direction and amount of two-phase flow through the balancing damper assembly 26 is further manipulated by the geometric configuration of the balancing damper assembly. As illustrated in FIG. 7, both the inlet end 80 and outlet end 82 may have circular cross-sections. The central portion 48 of the housing 42 preferably has a rectangular cross-section. The rectangular shape of the central portion 48 provides additional room for the two-phase flow to pass between the outer edges 40-1 and 41-2 of the blades 40 and 41, and the inner walls of the housing 42-2. Additionally, the balancing damper assembly 26 has a transition region 49, wherein the balancing damper assembly 26 transitions from a circular to square cross-section at its inlet end 80, and then back to a circular cross-section at its outlet end 82. It should be appreciated that the components of the balancing damper assembly 26 are not limited to any particular geometric configuration.

The shape and construction of the blades further manipulates the direction and amount of two-phase flow through the balancing damper assembly. As illustrated in FIGS. 3 and 6, the blades 40 and 41, are preferably rectangular in shape, but the blades can have various geometric configurations in alternate embodiments.

The blades 40 and 41 can be attached to the housing in a variety of ways. Preferably, the blades 40 and 41 are welded to rotatable shafts 122-1 and 122-2. Alternatively, the blades 40 and 41 can be screwed or nailed to the rotating shafts 122-1 and 122-2.

To connect the balancing damper assembly 26 to the pipes 24 and 25, as illustrated in FIG. 7, an inlet plate 96 and outlet plate 86 connect the balancing damper assembly 26 to the coal pipes 24 and 25. The balancing damper assembly may be circular in shape and can be secured to the coal pipes 24 and 25 in a variety of ways. According to one preferred embodiment, inlet plate 96 and outlet plate 86 can be screwed to the coal pipes 24 and 25 through screw holes 86-1 to 86-18 and 96-1 to 96-18 (not all shown) located on the inlet and outlet plates 86 and 96. It should be appreciated that the number of screw holes will depend on the size and strength of the screws utilized. The inlet plate 86 and outlet plate 96 can also be attached by rivets, clamps, friction, adhesives, etc. Additionally the balancing damper housing 42 may be directly welded to coal pipes 24 and 25 without the inlet circular plate 96 and outlet circular plate 86.

Figure 10:
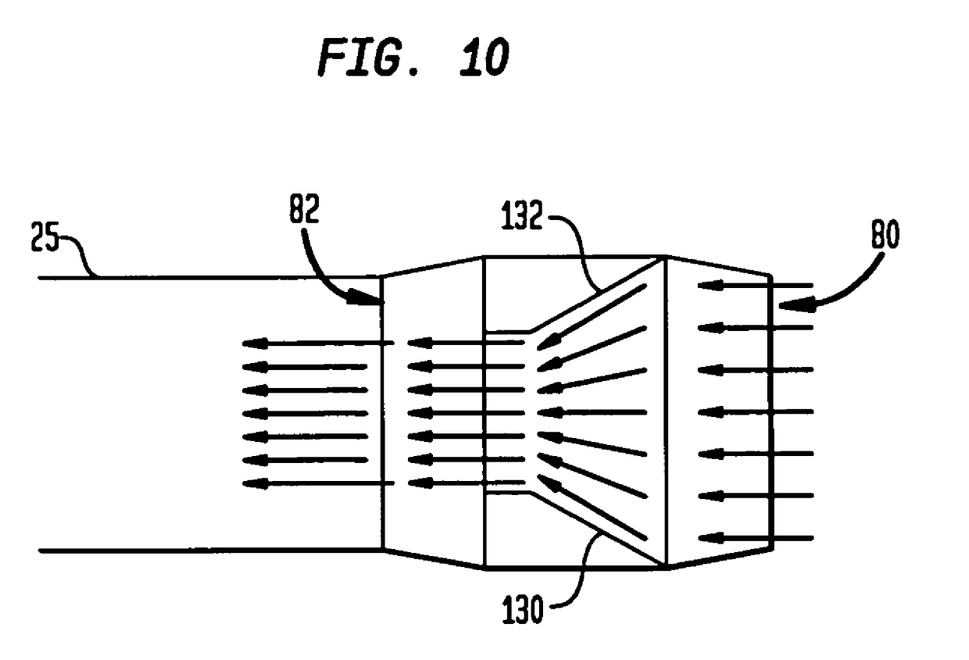
FIG. 10 is a cross-sectional view of a two-phase flow traveling through the balancing damper assembly referenced in FIG. 6.
Figure 11:
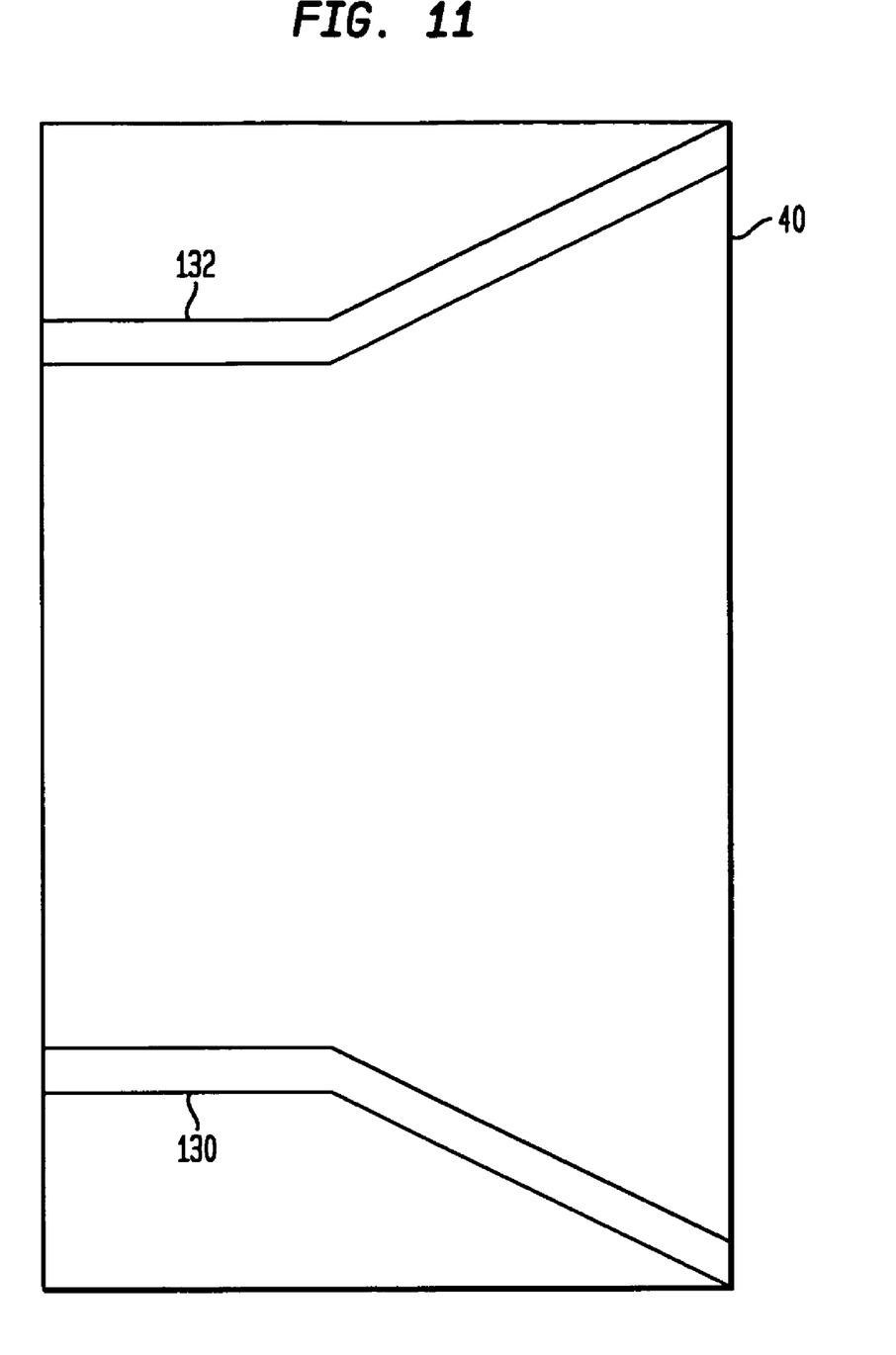
FIG. 11 is a top view of a blade of the balancing damper assembly according to the present invention.

In another preferred embodiment, as illustrated in FIGS. 10 and 11, a set of turning baffles 130 and 132 are disposed on each of the blades 40 and 41. The turning baffles 130 and 132 provide yet another feature of the present invention. The turning baffles 130 and 132 further eliminate the occurrences of turbulent eddies in the coal pipe that result in long-term damage to the coal pipes. As illustrated in FIG. 10, the location of the turning baffles 130 and 132 on the blades 40 and 41 distributes the flow of pulverized fuel and the carrier gas towards the center of the blades 40 and 41 and the center of the balancing damper assembly 26. This ultimately directs the two-phase flow through the center of the coal pipe 25. Thus, any turbulent eddies that may develop are therefore concentrated at the center of pipe and are harmless to the inner walls of the furnace pipe system. FIG. 11 shows a top view of a blade 40 having a set of turning baffles 130 and 132.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An assembly for use in a furnace system, said assembly comprising:
   (a) a burner assembly;
   (b) a pipe arranged upstream of said burner assembly;
   (c) a balancing damper arranged along said pipe downstream of a fuel source; said balancing damper comprising a housing having a passageway therein and an inner wall and an outer wall, and a plurality of blades arranged in the passageway, each blade having an inner edge and an outer edge disposed within said housing, at least one of the blades being spaced from the inner wall, said plurality of blades being movable between a closed position and an open position; and
   (d) a tower distributor arranged upstream from said balancing damper and coupled to said balancing damper so as to enable an output from said tower distributor to be supplied to said balancing damper,
   said damper housing further comprising an inlet section, said inlet section having a circular shape; a central section, said central section having a square shape; and an outlet section, said outlet section having a circular shape.

2. An assembly for use in a furnace system, said assembly comprising:
   (a) a burner assembly;
   (b) a pipe arranged upstream of said burner assembly;
   (c) a balancing damper arranged along said pipe downstream of a fuel source; said balancing damper comprising a housing having a passageway therein and an inner wall and an outer wall, and a plurality of blades arranged in the passageway, each blade having an inner edge and an outer edge disposed within said housing, at least one of the blades being spaced from the inner wall, said plurality of blades being movable between a closed position and an open position;

said burner assembly including a fuel injector arranged downstream of said balancing damper and coupled to said balancing damper so as to be operable to receive an output from said balancing damper; and (d) an air register coupled to said fuel injector and operable to enable air to be provided to said fuel injector, said damper housing further comprising an inlet section, said inlet section having a circular shape; a central section, said central section having a square shape; and an outlet section, said outlet section having a circular shape.

3. An assembly for use in a furnace system, said assembly comprising:
   (a) a burner assembly;
   (b) a pipe arranged upstream of said burner assembly; and
   (c) a balancing damper arranged along said pipe downstream of a fuel source; said balancing damper comprising a housing having a passageway therein and an inner wall and an outer wall, and a plurality of blades arranged in the passageway, each blade having an inner edge and an outer edge disposed within said housing, at least one of the blades being spaced from the inner wall, said plurality of blades being movable between a closed position and an open position,
   said damper housing further comprising an inlet section, said inlet section having a circular shape; a central section, said central section having a square shape; and an outlet section, said outlet section having a circular shape, and
   in which at least one turning baffle is disposed on at least one of said plurality of said blades.

4. An assembly for use in a furnace system, said assembly comprising:
   (a) a burner assembly;
   (b) a pipe arranged upstream of said burner assembly;
   (c) a balancing damper arranged along said pipe downstream of a fuel source; said balancing damper comprising a housing having a passageway therein and an inner wall and an outer wall, and a plurality of blades arranged in the passageway, each blade having an inner edge and an outer edge disposed within said housing, at least one of the blades being spaced from the inner wall, said plurality of blades being movable between a closed position and an open position; and
   (d) an adjustment means for controlling the position of at least one blade,
      said damper housing further comprising an inlet section, said inlet section having a circular shape; a central section, said central section having a square shape; and an outlet section, said outlet section having a circular shape, and
      in which said adjustment means comprises a remote control means.

5. A balancing damper for use in a furnace system, said balancing damper comprising:
   a housing having a passageway therein and an inner wall and an outer wall; and
   a plurality of blades arranged in the passageway, each blade having an inner edge and an outer edge disposed within said housing, at least one of the blades being spaced from the inner wall, said plurality of blades being movable between a closed position and an open position whereby a fuel stream including solid fuel particles in a carrier gas is transportable in the balancing damper,
   said damper housing further comprising an inlet section, said inlet section having a circular shape; a central section, said central section having a square shape; and an outlet section, said outlet section having a circular shape, and
   in which said blades are rectangular.

6. A balancing damper for use in a furnace system, said balancing damper comprising:
   a housing having a passageway therein and an inner wall and an outer wall; and
   a plurality of blades arranged in the passageway, each blade having an inner edge and an outer edge disposed within said housing, at least one of the blades being spaced from the inner wall, said plurality of blades being movable between a closed position and an open position whereby a fuel stream including solid fuel particles in a carrier gas is transportable in the balancing damper,
      said damper housing further comprising an inlet section, said inlet section having a circular shape; a central section, said central section having a square shape; and an outlet section, said outlet section having a circular shape, and
      in which at least one turning baffle is disposed on at least one of said plurality of blades.

7. A balancing damper for use in a furnace system, said balancing damper comprising:
   a housing having a passageway therein and an inner wall and an outer wall;
   a plurality of blades arranged in the passageway, each blade having an inner edge and an outer edge disposed within said housing, at least one of the blades being spaced from the inner wall, said plurality of blades being movable between a closed position and an open position whereby a fuel stream including solid fuel particles in a carrier gas is transportable in the balancing damper; and
   an adjustment means for controlling the position of at least one blade,
   said damper housing further comprising an inlet section, said inlet section having a circular shape; a central section, said central section having a square shape; and an outlet section, said outlet section having a circular shape.

8. The balancing damper of claim 7, wherein said adjustment means comprises a control knob.

9. The balancing damper of claim 7, wherein said adjustment means comprises a remote control means.

* * * * *